(12) United States Patent
Killingbeck

(10) Patent No.: US 12,345,202 B2
(45) Date of Patent: Jul. 1, 2025

(54) ENGINE

(71) Applicant: Tree Associates Ltd., Norwich (GB)

(72) Inventor: Bernard Killingbeck, Norwich (GB)

(73) Assignee: Tree Associates Ltd., Norwich (GB)

( * ) Notice: Subject to any disclaimer, the term of this patent is extended or adjusted under 35 U.S.C. 154(b) by 0 days.

(21) Appl. No.: 18/711,182

(22) PCT Filed: Nov. 18, 2022

(86) PCT No.: PCT/GB2022/052936
§ 371 (c)(1),
(2) Date: May 17, 2024

(87) PCT Pub. No.: WO2023/089331
PCT Pub. Date: May 25, 2023

(65) Prior Publication Data
US 2025/0012219 A1    Jan. 9, 2025

(30) Foreign Application Priority Data
Nov. 18, 2021    (GB) ...................................... 2116613

(51) Int. Cl.
*F02C 7/141*    (2006.01)
*F02C 1/10*    (2006.01)
*F02C 6/18*    (2006.01)

(52) U.S. Cl.
CPC .............. *F02C 7/141* (2013.01); *F02C 1/10* (2013.01); *F02C 6/18* (2013.01); *F05D 2220/76* (2013.01); *F05D 2260/213* (2013.01)

(58) Field of Classification Search
CPC .... F02C 7/141; F02C 1/10; F02C 6/18; F05D 2220/76; F05D 2260/213
See application file for complete search history.

(56) References Cited

U.S. PATENT DOCUMENTS

| | | |
|---|---|---|
| 4,403,911 A | 9/1983 | Possell |
| 10,683,800 B2 * | 6/2020 | Killingbeck ............... F02C 1/10 |

(Continued)

FOREIGN PATENT DOCUMENTS

| | | |
|---|---|---|
| DE | 102019129308 A1 | 5/2021 |
| EP | 3103962 A1 | 12/2016 |

(Continued)

OTHER PUBLICATIONS

PCT Patent Application No. PCT/GB2022/052936 International Search Report and Written Opinion date Feb. 2, 2023.

*Primary Examiner* — Hoang M Nguyen
(74) *Attorney, Agent, or Firm* — Erise IP, P.A.

(57) ABSTRACT

An engine (1) comprises a compressed gas source (3) and a fluid circuit connected to an output of the compressed gas source such that compressed gas can be driven through the circuit by the compressed gas source. The output of the compressed gas source is connected, through the fluid circuit, to a turbine component (5) connected to a rotating shaft (9) that acts as the output of the engine in use. A heat exchanger (13) receives fluid in the circuit that has passed through the turbine component (5) and is arranged to reduce the temperature and pressure of the fluid. The turbine component (5) comprises a boundary layer turbine comprising a plurality of axially aligned discs (51), wherein each disc comprises an outlet vent (53) arranged towards the centre of the disc.

20 Claims, 6 Drawing Sheets

(56) References Cited

U.S. PATENT DOCUMENTS

| | | | |
|---|---|---|---|
| 2013/0294890 A1 | 11/2013 | Cepeda-Rizo et al. | |
| 2015/0260408 A1* | 9/2015 | Bergen | F01D 1/36 60/746 |
| 2017/0205108 A1* | 7/2017 | Petrovic | F01D 15/10 |
| 2024/0076995 A1* | 3/2024 | Ford | F04D 25/04 |

FOREIGN PATENT DOCUMENTS

| | | |
|---|---|---|
| EP | 3565955 B1 | 11/2020 |
| GB | 2110766 A | 6/1983 |
| WO | 2009088955 A2 | 7/2009 |
| WO | 2011057019 A1 | 5/2011 |
| WO | 2017021736 A1 | 2/2017 |

\* cited by examiner

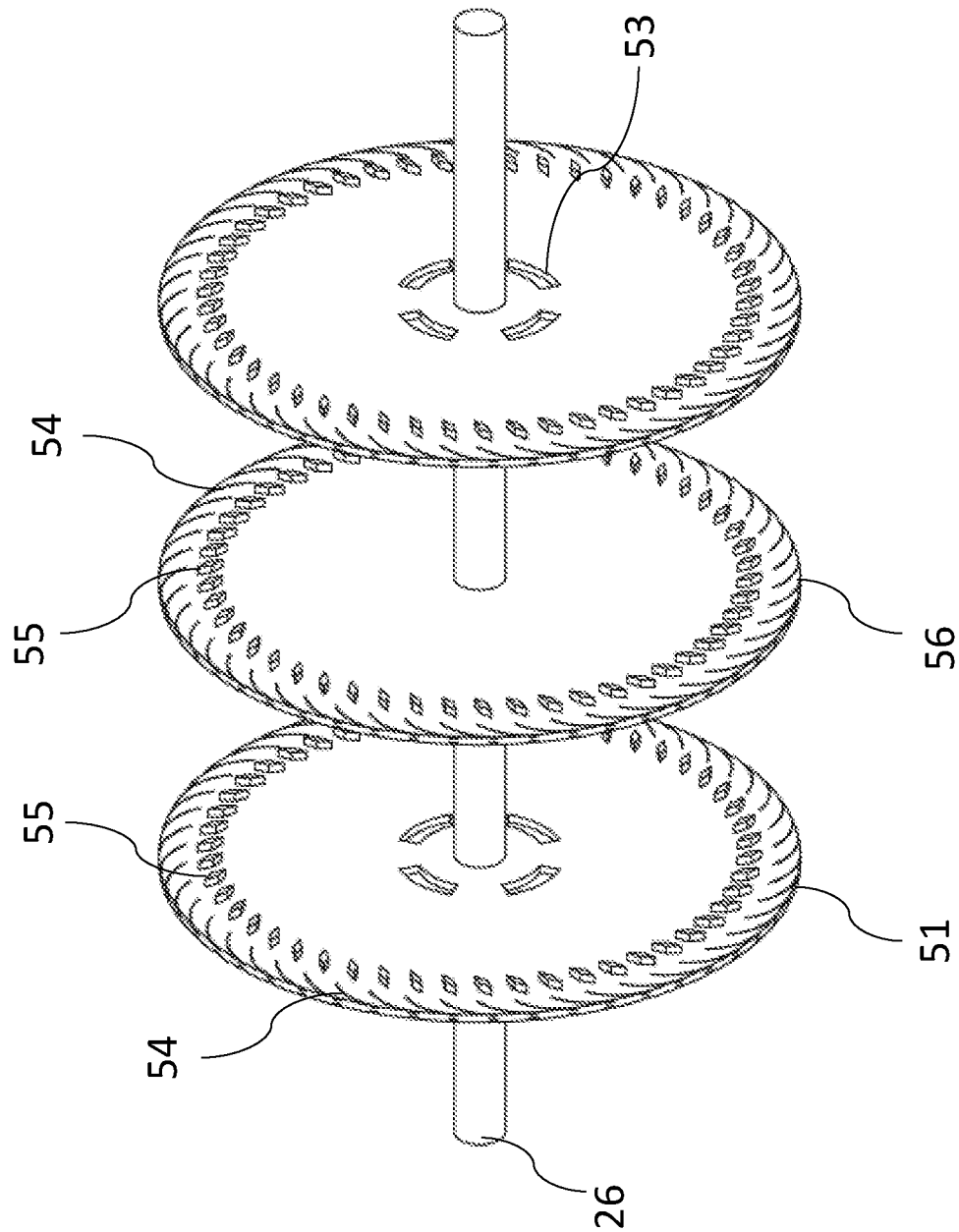

ENGINE

RELATED APPLICATION

The present application is a national stage application under 35 U.S.C. § 371 of International Application No. PCT/GB2022/052936, filed Nov. 18, 2022, which claims priority to Great Britain Patent Application No. 2116613.7, filed Nov. 18, 2021. The above referenced applications are hereby incorporated by reference.

FIELD

The present invention relates to an engine which employs circulating compressed gas to drive a turbine to provide energy output.

A wide variety of engines are well known, from conventional internal combustion engines, through to engines driven by compressed air, wind, water power and other sources.

All such engines are driven by the need to provide energy output whilst minimising energy consumption and also minimise emissions that may be harmful to the environment. Furthermore, they often have the need to have simple control of their output, as well as the desire to have a long useable life through the use of a minimal amount of moving components and the provision of components with minimal wear and tear to reduce maintenance requirements.

The present invention seeks to provide an engine which is highly efficient, which is highly controllable in terms of its output, and yet which is simple and easy to maintain and has a long useable lifetime with minimal maintenance.

SUMMARY

According to the present invention, there is provided an engine comprising a compressed gas source and a fluid circuit connected to an output of the compressed gas source such that compressed gas can be driven through the circuit by the compressed gas source, the output of the compressed gas source being connected, through the fluid circuit, to a turbine component connected to a rotating shaft that acts as the output of the engine in use; a heat exchanger for receiving fluid in the circuit that has passed through the turbine component and arranged to reduce the temperature and pressure of the fluid; wherein the turbine component comprises a boundary layer turbine comprising a plurality of axially aligned discs, and wherein each disc comprises an outlet vent arranged towards the centre of the disc.

In the past, engines employing turbines to provide energy from circulating gas have used bladed turbine components. Though boundary layer turbines (also known as Tesla turbines) have existed for many years, they are not in common use. Boundary layer turbines are difficult to start and do not operate efficiently until they have reached extremely high rotational speeds (e.g. well over 20,000 rpm). There is a risk of the boundary layer turbine discs warping at these high speeds, so constructing a boundary layer turbine that can withstand the efficient running speeds is not seen as commercially viable compared to bladed turbines for many applications.

What has been appreciated by the applicant however is that, contrary to what might be expected, including a boundary layer turbine (as described herein) in an engine with a compressed gas source and heat exchanger can provide a viable and more efficient source of energy than existing engines using bladed turbines. In use, the gas is driven by the compressed gas source into the turbine component and across the surface of the turbine discs. Due to the boundary layer effect, nearby fluid drags on the surface of a disc, transferring energy to the disc and causing it to rotate. As the fluid loses energy it spirals towards the centre of the disc where the exhaust vent is arranged. The amount of energy available from a boundary layer turbine is significantly greater than a standard bladed turbine. This is because energy is transferred across the whole length of a disc spiral, which is substantially further (for a turbine of given size) than the distance fluid travels as it passes over the blades of a bladed turbine. This also means that a significantly smaller sized boundary layer turbine may be used instead of a standard bladed turbine to output the same amount of energy.

A further benefit of the boundary layer turbine is that it can tolerate gas, vapour and liquid, however for convenience and clarity the description will describe gas (or more generally, fluid) moving through a fluid circuit. The terms "turbine disc" and "disc" are used interchangeably and references to "disc" components should be considered to refer to a disc of the plurality of axially aligned discs mentioned above (unless otherwise stated, such as the solid disc described below). The discs being axially aligned meaning that the major planes formed by each of the discs (i.e. by the disc diameter and circumference) are parallel. The rotating shaft acting as the output of the engine in use means that the rotating shaft outputs the rotation to another component connected to the shaft (e.g. a generator as discussed below), and the rotating shaft outputs mechanical rotational power.

The compressed gas source may comprise a compressor, and an output of the heat exchanger is connected to an input of the compressor such that the fluid circuit is a closed fluid circuit. Additionally or alternatively, the compressed gas source may comprise a gas storage vessel.

Having the compressed gas source comprise a compressor and the fluid circuit be a closed fluid circuit ensures that the loss of fluid within the circuit is absolutely minimal, meaning that the fluid can be cycled over a long period with minimal moving parts in the engine as a whole and extremely low environmental damage with no consumption of fluid used within the circuit.

The gas storage vessel is a vessel for storing gas at pressures high enough to drive the turbine component when the gas is released from the vessel. When the compressed gas source comprises a gas storage vessel, the vessel may be included in the engine in addition to the compressor or as an alternative to the compressor. The gas storage vessel acts as a reservoir of potential energy to be used to drive the turbine component and generate engine output on demand. Preferably, the gas storage vessel is removably connected to the engine, such the vessel can be removed from the engine (e.g. when depleted of compressed gas) and replaced by another (or the same refilled) gas storage vessel.

When the engine includes the gas storage vessel but not the compressor, the gas is output from the vessel to drive the turbine component and pass through the heat exchanger before being leaving the open fluid circuit (either to a further vessel for storage, or to the surrounding environment).

When the engine includes the gas storage vessel and the compressor, the engine has increased utility. For example, the engine may operate as described above when the compressed gas source is a compressor with a closed fluid circuit, efficiently generating output with minimal loss of fluid. In situations where additional engine power is desired, the gas storage vessel may then be employed to temporarily boost the rate of fluid flow through the turbine component, thereby further increasing the engine output. The engine may also include a mechanism such as a relief valve to allow fluid (introduced from the gas storage vessel) to escape the fluid circuit, thereby regulating the fluid circuit.

At least one disc of the plurality of discs may comprise a plurality of grooves radially arranged around the edge of the disc for directing fluid to spiral towards the centre of the disc.

In this way, the grooves further direct fluid from the turbine inlet, configured to provide a longer spiral (i.e. fluid travel path from the turbine inlet to the centre of the disc) and increasing the contact area between the gas and turbine discs as the gas moves towards the exhaust vents. This increases the efficiency of the turbine component and is particularly advantageous when the engine is first started (i.e. at lower speeds).

At least one disc of the plurality of discs may comprise a plurality of airfoils radially arranged around the disc for directing fluid to spiral towards the centre of the disc.

In this way, the airfoils act similarly to the grooves and direct fluid across the surface of a disc once the fluid enters the turbine component. Preferably, the airfoils are arranged nearby the edge of the disc. The accumulated weight of the plurality of airfoils around the perimeter of the discs assists rotation of the discs and helps to prevent warping. Preferably, the airfoils are comprised of a dense material such as titanium.

The airfoils may be arranged adjacent to the grooves. In this way, the airfoils and grooves act together to direct flow of fluid across the discs of the turbine.

The airfoils may extend between adjacent discs and connect the adjacent discs. Attaching adjacent discs together in this way increases the strength of the boundary layer turbine component and further reduces disc warping.

The airfoils may be early cambered airfoils or double wedge airfoils. Early cambered airfoils have been found to most improve efficiency at subsonic speeds and double wedge airfoils have been found to most improve efficiency at supersonic speeds.

The boundary layer turbine may further comprise a solid disc arranged between two adjacent discs of the plurality of discs, wherein the solid disc is axially aligned with the plurality of discs.

Preferably, the solid discs structurally mirrors the plurality of discs without the outlet vent.

The solid disc structurally mirroring the plurality of discs without the outlet vent means that the solid disc is structurally the same as the plurality of turbine discs also comprised within the boundary layer turbine, except that the solid disc does not include an outlet vent. For example, if a boundary layer turbine includes turbine discs with airfoils connecting adjacent discs, then the solid disc will also comprise airfoils configured in the same manner and connecting the solid discs to adjacent discs.

In this way, the solid disc further contributes to rotation of the boundary layer turbine while preventing merging of fluid flow at the exhaust vents of discs. Such merging creates turbulence and wastes energy, therefore including the solid disc further increases the efficiency of the turbine component.

Preferably, the solid disc is centrally arranged along the plurality of discs. This arrangement has been found to maximise the reduction of turbulence.

Optionally, the solid disc may comprise a fanning element arranged towards the centre of the solid disc, wherein the fanning element is configured to accelerate fluid flow away from the solid disc and through the turbine component.

In these examples of the invention, the solid disc is structurally the same as the plurality of turbine discs except that it includes the fanning element and does not include an exhaust vent. In a specific example, the fanning element may be a raised feature on the surface of the solid disc that encourages fluid to flow away from the solid disc when the solid disc is rotated.

The output of the compressed gas source may connect to the turbine component using a plurality of turbine inlets.

The output of the compressed gas source connecting to the turbine component using a plurality of turbine inlets means that fluid from the compressed gas source can enter the turbine component (e.g. to drive the turbine component) at multiple discrete points. Multiple turbine inlets may be provided between a single pair of discs. Increasing the number of turbine inlets increases the number of fluid flow paths that spiral across the surface of a disc, thereby increasing the energy transferred to a single disc.

The plurality of turbine inlets may be evenly spaced around the circumference of the turbine component. In this way, the boundary layer effect forces are evenly distributed across the surface of the discs.

The outlet vent of each disc of the plurality of discs may comprise curved or angled edges towards a direction of flow of the fluid circuit. Configuring the outlet vents in this manner reduces turbulent flow of fluid through the outlet vent, thereby increasing of the turbine component. For example, the edges of the outlet vent may be tapered or cambered towards an opening of the outlet vent.

A check valve may be positioned between the outlet of the heat exchanger and the input of the compressed gas source and configured to allow fluid to flow only in the direction from the heat exchanger to the compressed gas source.

Controlling the flow of expanded circulated fluid in this manner optimises the performance and improves the efficiency of the engine for a given load.

The compressed gas may be any suitable gas such as ammonia or, more preferably for safety and operational efficiency reasons, may be carbon dioxide.

The engine may further comprise a generator connected to the output shaft.

At least some of the electricity generated by the generator may be employed to power the compressed gas source. Powering the compressed gas source may refer to starting and/or driving the compressed gas source.

The engine may further comprise a control component for controlling feedback of electricity generated from the generator to the compressed gas source. The control component is connected to the generator. This means that some of the electricity output from the generator goes back to the compressed gas source, and that the control component provides the ability to control the feedback of power into the engine system in order to optimise the operation of the engine.

The engine may further comprise energy recover means associated with the heat exchanger to recover a heat energy therefrom and provide an additional energy output from the engine. This allows heat energy to be converted into electrical energy to start and/or drive the compressed gas source, improving the efficiency of the engine.

BRIEF DESCRIPTION OF THE DRAWINGS

Aspects of the invention will now be described, by way of example only, with reference to the accompanying drawings, in which:

FIG. 8 illustrates part of a boundary layer turbine according to a further example of the present invention.

DETAILED DESCRIPTION

Figure 1:
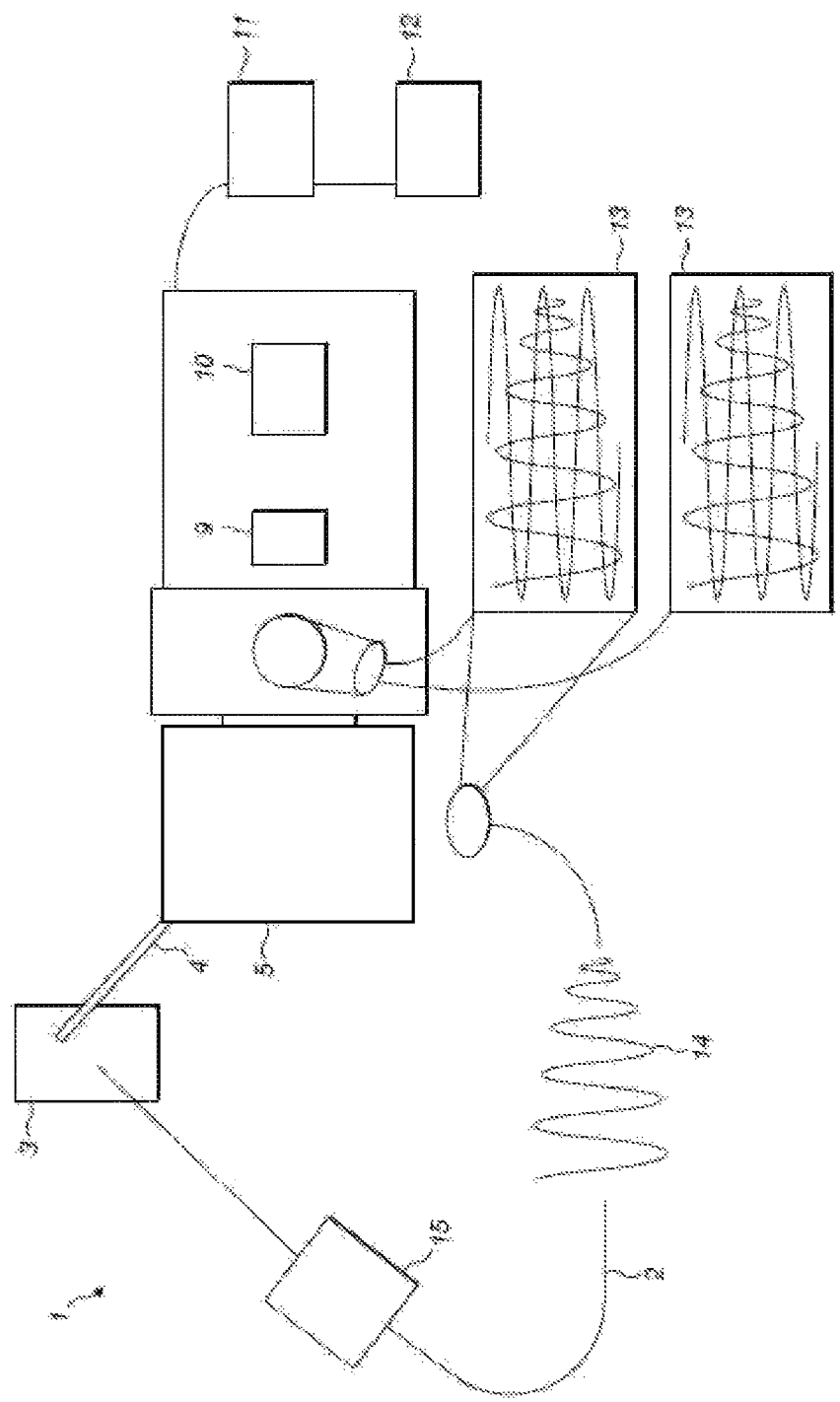
FIG. 1 is a schematic view of an engine according to the present invention.

FIG. 1 shows a schematic of an engine 1. A compressor provides a compressed gas source 3 which, in use, compresses gas in the circuit and drives it from an outlet 4 of the compressed gas source towards a turbine component 5. The compressor in this example is electrically powered but may have an alternative power source. The diameter of the compressed gas source outlet 4 controls the pressure and flow rate of the compressed gas as it arrives at the turbine 5. High efficiency is provided if the pressure and temperature of the gas is at its critical point in this section of the fluid circuit. A heater (not shown) can be incorporated adjacent to the compressed gas source 3 to heat the compressed gas to aid in achieving this. As gas passes from the compressed gas source outlet 4 into the turbine component 5 it passes through discs 51, expanding as it does so and driving the series of discs 51 and a central shaft 9 to which the discs 51 are attached. The shaft 9 acts as an output of the engine 1, and can be connected to a mechanical component to be driven, e.g. through a gear box. The turbine component 5 and compressed gas source 3 are separate components (i.e. the component bodies are separate) and fluidly connected.

In this example it is shown connected to an electrical generator 10 which is linked to control components 11 and 12. These control components can receive electrical power from the generator 10 to control the output load on the shaft 9, the operating output of the generator 10, and also potentially to control feedback of electricity generated from the generator 10 to the compressor, again to control overall operating output of the engine to optimise its energy efficiency. The compressor and generator 10 are separate components and electrically connected. It may be that in addition, or as an alternative, the generator 10 is mechanically connected to the compressor so that it can be operated as a motor to power (i.e. start and/or drive) the compressor. It may also be that components from the generator 10 and turbine components are integrated into a single unit to reduce size and mechanical losses associated with connection of the two.

In one example the generator generates AC at 400 Hz, to provide high efficiency, yet also has stepping components to drop it to 50 Hz for use with standard electrical components.

After passing through the turbine discs 51, the fluid, now at a lower pressure, passes out of the turbine component 5 through a heat exchanger 13. In this example the heat exchanger 13 is a series of pipes and acts to dissipate residual heat in the fluid. The heat exchanger 13 allows heat energy to be recovered and potentially converted into other forms of energy, potentially even electrical energy, to improve the efficiency of the electrical output of the engine or indeed to provide supply to control components or to the compressed gas source 3. The output of the heat exchanger 13 is then fed through a further pressure reducing component 14, which is optional, and through a check valve 15, which is also optional, and back to be compressed once more by the compressor. The check valve 15 ensures fluid flow in a single direction and can help ensure correct flow of fluid through the system, particularly during start-up, and can be used to regulate the output of the engine through flow of the fluid, therefore optimising efficiency of the engine.

The check valve 15 can also be used to regulate the pressure differential across the compressed gas source 3 to optimise its operational efficiency.

A relief valve (not shown) may be placed at an appropriate point in the fluid circuit to release unwanted pressure build up if necessary for safety reasons.

In one example of operation the pressure differential across the compressed gas source 3 is controlled at around 2 bar with $CO_2$ as the driven gas (60 bar at the compressed gas source input and 58 at output).

Figure 2:
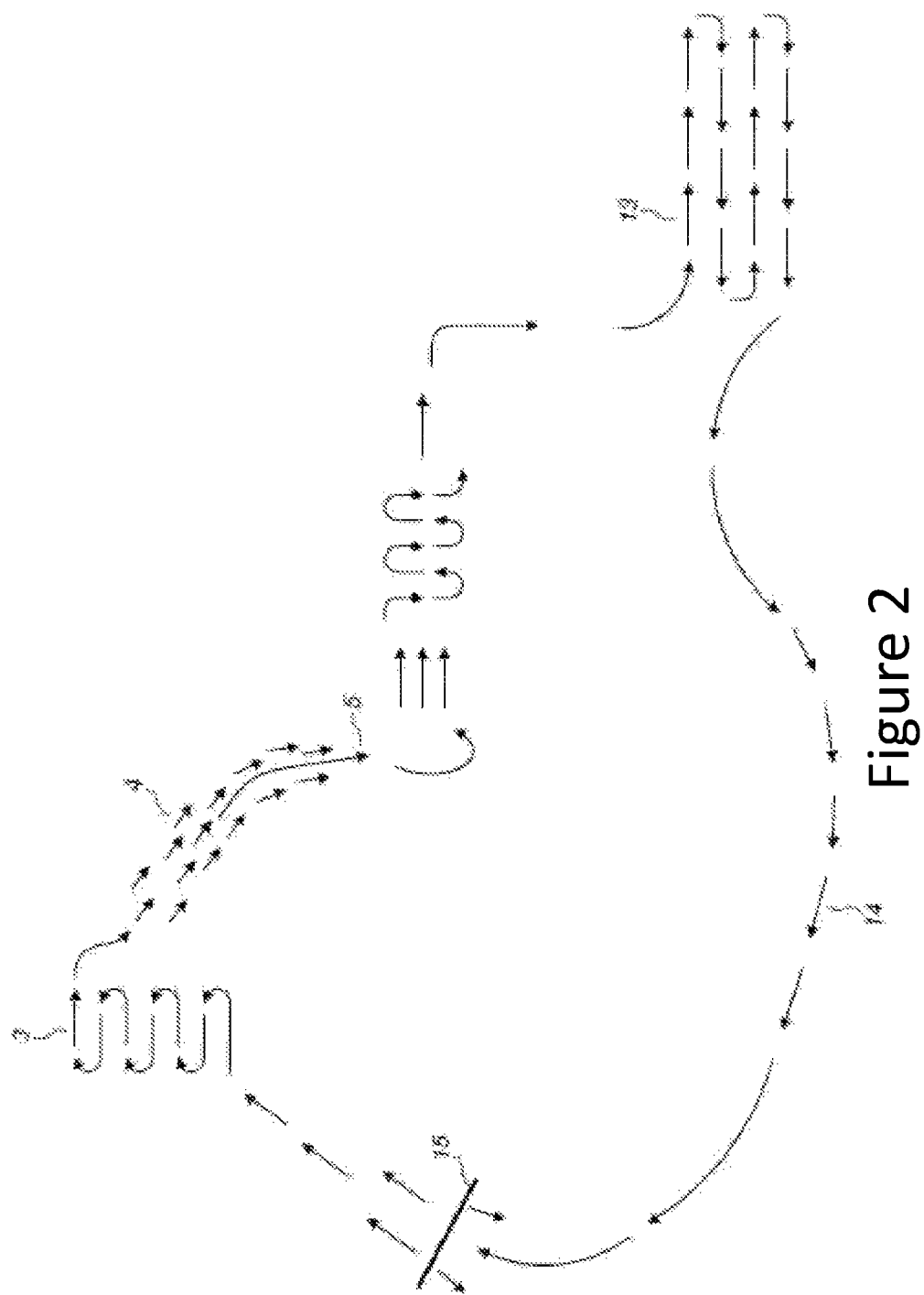
FIG. 2 is a schematic diagram showing the flow of circulating gas within the engine of FIG. 1.

FIG. 2 shows, in schematic form, the flow of fluid through the engine 1, with the location of fluid in the closed circuit within the relevant components, as outlined in FIG. 1 having the corresponding numbering. As will be appreciated from the above, by simple control of the compressed gas source 3 and its output through the compressed gas source outlet 4, the generator 10 can be powered to optimise the output of the engine 1 with high levels of efficiency and a minimal number of moving parts to reduce maintenance and improve operation. The configuration is such that the noise output of the engine is minimal when operating the engine, and that the engine can be controlled to have a wide variety of power outputs with minimal adaptation thereto through appropriate operation of the compressed gas source 3, feedback of generated electricity to the compressed gas source 3, and appropriate energy recovery from the heat exchanger 13 as well as appropriate control of the check valve 15.

In the above examples, a compressor is used as the compressed gas source 3. Alternatively, or in addition to the compressor or another compressed gas source 3, a gas storage vessel may be used as the compressed gas source 3.

FIGS. 3 to 8 provide further detail on the turbine component 5. Surprisingly, it has been found that a boundary layer turbine can be configured to provide the engine with higher efficiency output than a traditional bladed turbine. The turbine component 5 is a boundary layer turbine (also known as a Tesla turbine) comprising a plurality of discs 51 connected to the rotating shaft 9. The discs 51 are axially aligned with each other along the rotating shaft 9, such that the planes formed by each of the discs 51 are parallel to each other, and the discs 51 are rotatable about the axis of the rotating shaft 9. Each disc 51 includes at least one exhaust vent 53 arranged near the centre of the disc 51. The exhaust vent 53 is an opening in the disc 51 that allows fluid to pass through from one side of the disc 51 to another. Preferably, the edges of the exhaust vents 53 are curved or angled (e.g. tapered or cambered) to improve flow of fluid through the vents 53 by reducing turbulent flow. That is, the edges of the exhaust vents 53 are curved or angled towards the direction of flow of the fluid through the disc 51.

Figure 3:
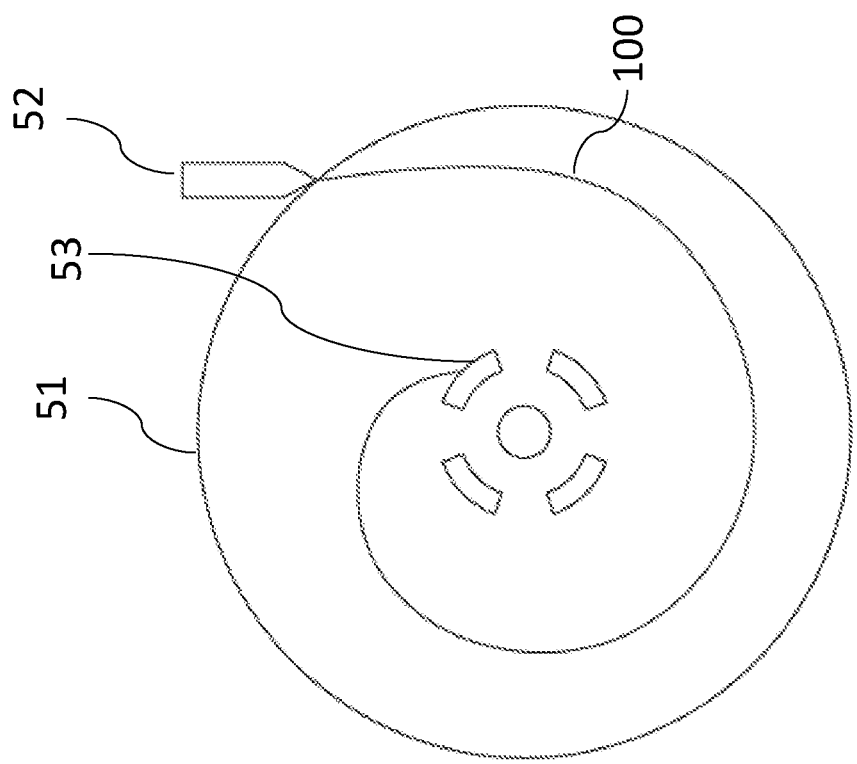
FIG. 3 illustrates a turbine disc of a boundary layer turbine according to an example of the present invention.

FIG. 3 shows a simplified example of a disc 51 of the turbine component 5. Fluid from the compressed gas source outlet 4 passes into the turbine component 5 through a turbine inlet 52 (such as a nozzle) and across the surface of the disc 51. Due to the boundary layer effect, as the fluid travels across disc 51 surface it drags on the disc 51 and transfers energy to the disc 51. This causes the disc 51 to rotate and the path of the fluid 100 to spiral towards the centre of the disc 51 and the exhaust vent(s) 53. In the example of FIG. 3 only one turbine inlet 52 is shown, however the turbine component 5 may comprise a plurality of turbine inlets 52 arranged around the circumference of the disc 51. Preferably, the turbine inlets 52 are evenly spaced around the circumference of the disc 51 to distribute the boundary layer effect forces evenly across the disc 51. The turbine component 5 includes a plurality of discs 51, therefore the turbine inlets 52 can be arranged such that a single inlet 52 spans several or all of the discs 51 (i.e. one-to-many), a single inlet 52 corresponds to a single gap between two discs 51 (i.e. one-to-one), or multiple inlets 52 correspond to a single gap between two discs 51 (i.e. many-to-one).

Figure 4:
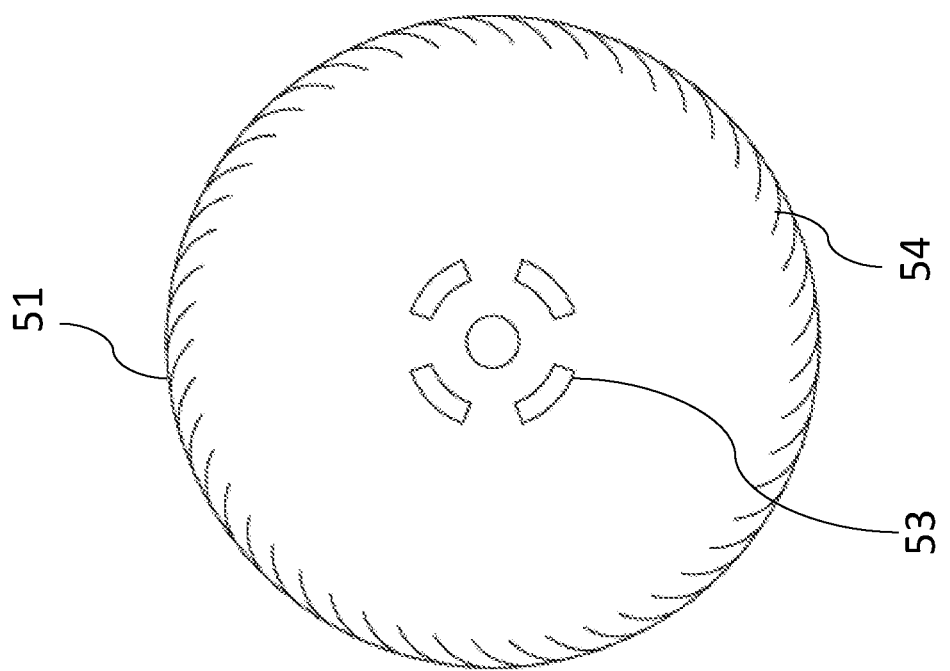
FIG. 4 illustrates a turbine disc of a boundary layer turbine according to a further example of the present invention.

The disc 51 of FIG. 4 includes grooves 54 that are radially arranged around the outer edge of a face of the disc 51. The grooves 54 are curved shaped to further direct the flow path of fluid towards the centre of the disc 51, and are evenly distributed around the circumference of the disc 51 to ensure the flow path of the fluid remains consistent (as long as the speed of the fluid as it leaves the turbine inlet 52 is constant). Preferably, the grooves 54 and inlet 52 and configured to direct the fluid flow path such that it completes a larger number of loops around the centre of the disc 51 before reaching the exhaust vent 53, thereby increasing the length of the fluid flow path and so increasing the amount of energy transferred from the fluid to the disc 51.

Figure 6:
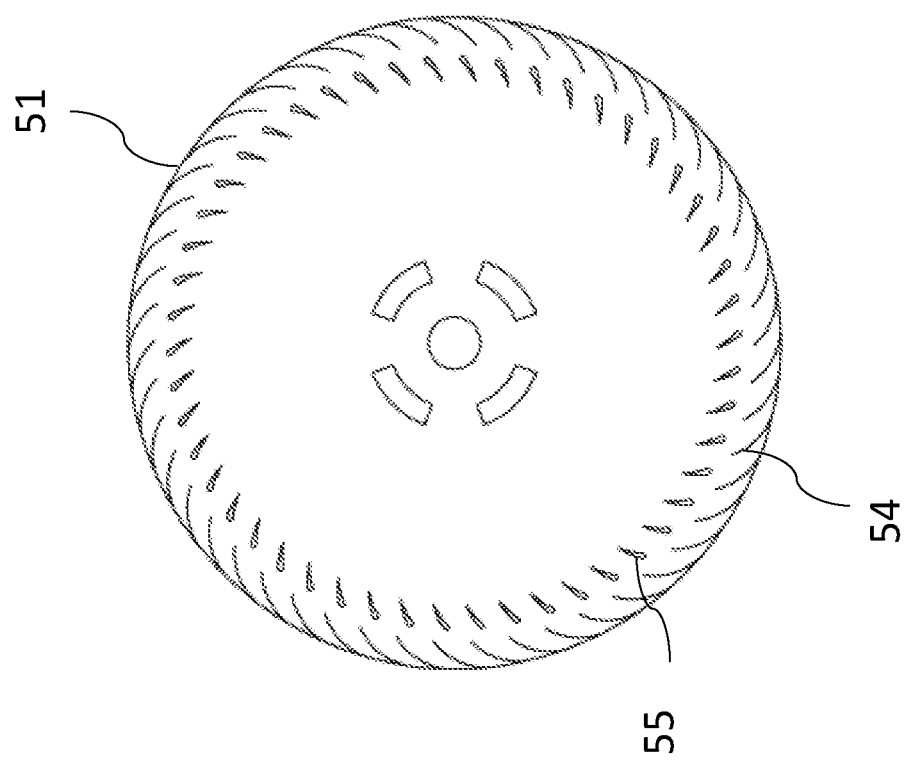
FIG. 6 illustrates a turbine disc of a boundary layer turbine according to yet another example of the present invention.
Figure 5:
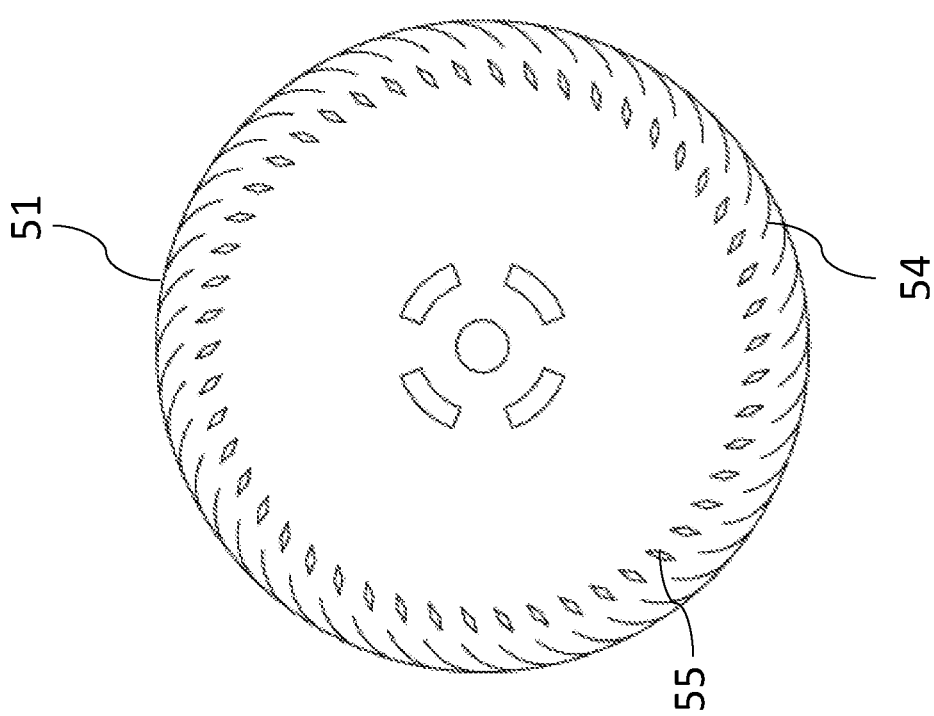
FIG. 5 illustrates a turbine disc of a boundary layer turbine according to another example of the present invention.

FIGS. 5 and 6 both show discs 51 further comprising airfoils 55 radially arranged around the face of the disc 51. In these examples, the disc 51 also includes grooves 54 at the edge of the disc 51, and the airfoils 55 are arranged on the interior side of the grooves 54 (i.e. the airfoils 55 are arranged closer to the centre of the disc 51 than the grooves 54 are), though in other examples the disc 51 may include airfoils 55 but not grooves 54. The airfoils 55 protrude from the surface of the disc 51 and further direct fluid flow to spiral around the disc 51. As discussed above in reference to the grooves 54, it is preferred that the airfoils 55 are configured to maximise the number of times the fluid flow path circumnavigates the exhaust vents 53.

The accumulated weight of the airfoils 55 near the edge of the disc 51 assists with rotation, therefore it is important that the airfoils 55 are evenly distributed around the disc 51 to ensure the disc 51 is balanced. The airfoil 55 configuration is selected to increase maximum rotation speed and increase the central shaft 9 torque. Though many different configurations are suitable for use on the disc 51, early cambered airfoil designs and double wedge airfoil designs have been found to be most effective for subsonic and supersonic speeds respectively. For example, at a given turbine component 5 operating frequency (e.g. 500 Hz or 30,000 rpm) where the turbine discs 51 have larger diameter and the airfoils 55 are arranged near the edge of the disc 51, the airfoils 55 will be travelling faster than the speed of sound and so the double wedge airfoil designs should be used (e.g., airfoils at the edge of a 250 mm diameter disc 51 at 500 Hz will rotate at around 390 m/s. In another example, at the same operating frequency, using smaller diameter turbine discs 5 the airfoils 55 will not move faster than the speed of sound and so the early cambered airfoil designs will be used (e.g. airfoils at the edge of a 100 mm diameter disc 51 at 500 Hz will rotate at around 160 m/s).

Figure 7B:
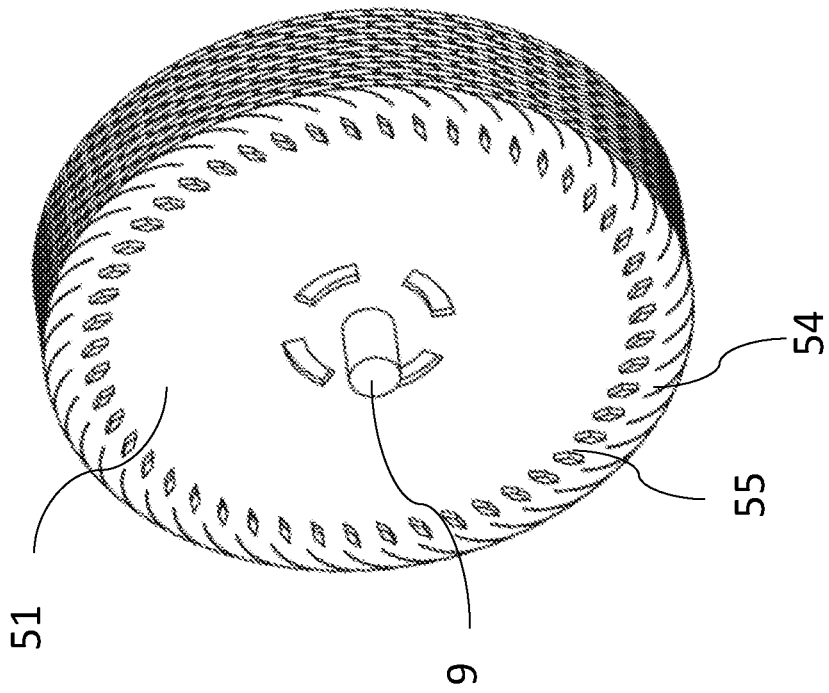
FIGS. 7A and 7B illustrate a boundary layer turbine according to an example of the present invention.
Figure 7A:
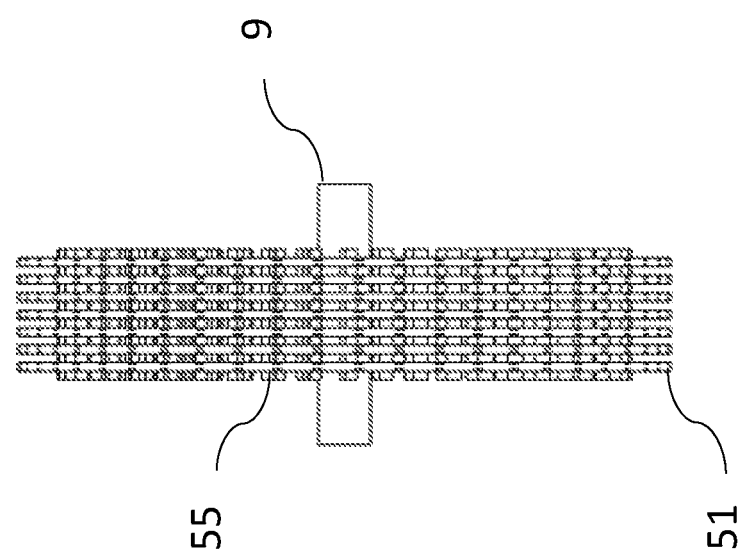

As shown in FIGS. 7A and 7B, the discs 51 are arranged close together with the airfoils 55 extending between adjacent discs 51 and connecting these discs 51. Connecting the discs 51 through the airfoils 55 in this way strengthens the turbine component 5 and prevents the discs 51 warping at high rotation speeds. Arranging adjacent discs 51 close together increases surface effects that arise between fluid and the discs 51, thereby increasing drag in a given volume and the efficiency of the turbine component 5.

It has been found that when the turbine component 5 does not comprise a solid disc 56, fluid flow merges at the exhaust vents 53 of one of the turbine discs 51, creating turbulence and reducing efficiency. This is typically the centre-most disc 51 if the turbine inlets 52 and discs 51 are evenly distributed. Therefore, introducing a solid disc 56 (i.e. a disc that does not include any exhaust vents) causes the flow path to be directed solely away from the solid disc 56, prevent fluid flow merging and reducing turbulent flow. An example of such a turbine component 5 is shown in FIG. 8, with the distance between the turbine discs 51 and solid disc 56 exaggerated to more clearly show the differences between the turbine discs 51 and solid disc 56.

As with the examples shown in FIGS. 7A and 7B, it is preferred that the turbine discs 51 and solid disc 56 are closely packed together and equally spaced along the turbine shaft 9. The solid disc 56 is the same size as the turbine discs 51 and is axially aligned with said turbine discs 51 such that the solid disc 56 still contributes to rotating the central shaft 9. Preferably, the solid disc 56 also comprises the same surface modifications (e.g. grooves 54 and airfoils 55) as the turbine discs 51, such that the configuration of the solid disc 56 mirrors that of the turbine discs 51 except for the absence of exhaust vents 53.

Though the example of FIG. 8 has a relatively smooth region in the area corresponding to the location of the exhaust vents of the turbine discs 51. In another example, the solid disc 56 comprises fanning elements (not shown) configured to accelerate fluid flow (in particular turbulent flow) in a direction away from the solid disc 56 and through the turbine component 5.

The invention claimed is:

1. An engine comprising a compressed gas source and a fluid circuit connected to an output of the compressed gas source such that compressed gas can be driven through the fluid circuit by the compressed gas source, the output of the compressed gas source being connected, through the fluid circuit, to a turbine component connected to a rotating shaft that acts as the output of the engine in use;
   a heat exchanger for receiving fluid in the fluid circuit that has passed through the turbine component and arranged to reduce a temperature and pressure of the fluid;
   wherein the turbine component comprises a boundary layer turbine comprising a plurality of axially aligned discs, and
   wherein each disc comprises an outlet vent arranged towards a centre of the disc,
   wherein at least one disc of the plurality of discs comprises a plurality of grooves radially arranged around an edge of the disc for directing fluid to spiral towards the centre of the disc.

2. The engine of claim 1, wherein the compressed gas source comprises a compressor, and an output of the heat exchanger is connected to an input of the compressor such that the fluid circuit is a closed fluid circuit.

3. The engine of claim 1, wherein the compressed gas source comprises a gas storage vessel.

4. The engine of claim 1, wherein at least one disc of the plurality of discs comprises a plurality of airfoils radially arranged around the disc for directing fluid to spiral towards the centre of the disc.

5. The engine of claim 4, wherein the airfoils are arranged adjacent to the grooves.

6. The engine of claim 4, wherein the airfoils extend between and connect adjacent discs.

7. The engine of claim 4, wherein the airfoils are early cambered airfoils or double wedge airfoils.

8. The engine of claim 1, wherein the boundary layer turbine further comprises a solid disc arranged between two adjacent discs of the plurality of discs, wherein the solid disc is axially aligned with the plurality of discs and structurally mirrors the plurality of discs without the outlet vent.

9. The engine of claim 8, wherein the solid disc is centrally arranged along the plurality of discs.

10. The engine of claim 8, wherein the solid disc further comprises a fanning element arranged towards the centre of the solid disc, and the fanning element is configured to accelerate fluid flow away from the solid disc.

11. The engine of claim 1, wherein the output of the compressed gas source connects to the turbine component using a plurality of turbine inlets.

12. The engine of claim 11, wherein the plurality of turbine inlets are evenly spaced around a circumference of the turbine component.

13. The engine of claim 1, wherein the outlet vent of each disc of the plurality of discs comprises curved or angled edges towards a direction of flow of the fluid circuit.

14. The engine of claim 1, further comprising a check valve positioned between the outlet of the heat exchanger and an input of the compressed gas source and configured to allow fluid to flow only in the direction from the heat exchanger to the compressed gas source.

15. The engine according to claim 1 wherein the compressed gas is one of carbon dioxide or ammonia.

16. The engine according to claim 1 further comprising a generator connected to the output shaft.

17. The engine according to claim 16 wherein at least some of the electricity generated by the generator is employed to power the compressed gas source.

18. The engine according to claim 17, further comprising a control component for controlling feedback of the at least some electricity generated from the generator to the compressed gas source.

19. The engine according to claim 1 further comprising energy recovery means associated with the heat exchanger to recover a heat energy therefrom and provide an additional energy output from the engine.

20. The engine of claim 10, wherein the fanning element is a raised feature on a surface of the solid disc.

* * * * *